UNITED STATES PATENT OFFICE.

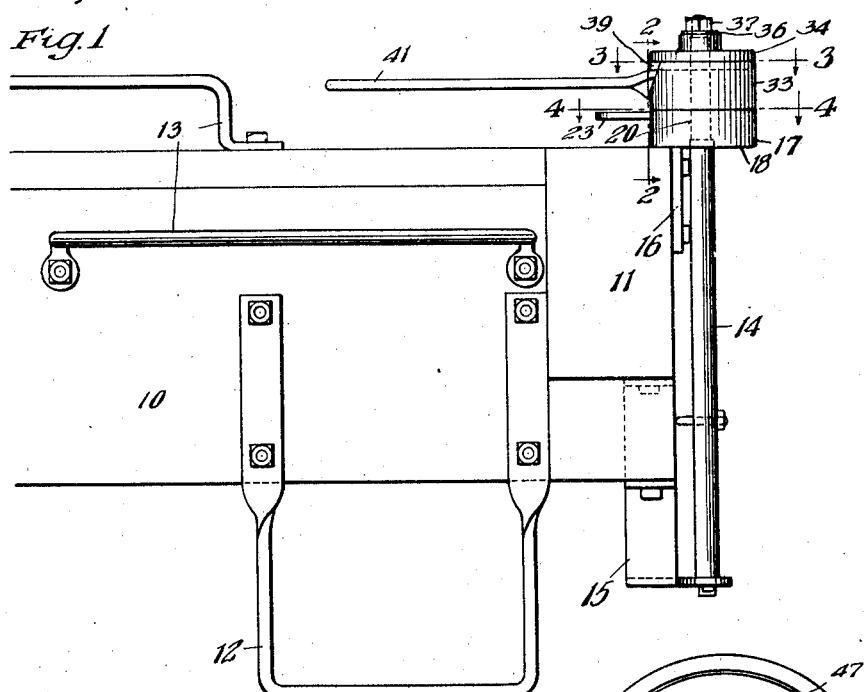

JOHN F. O'CONNOR, OF CHICAGO, ILLINOIS, ASSIGNOR TO WILLIAM H. MINER, OF CHAZY, NEW YORK.

BRAKE MECHANISM.

1,361,482.  Specification of Letters Patent.  Patented Dec. 7, 1920.

Application filed June 12, 1919. Serial No. 303,644.

*To all whom it may concern:*

Be it known that I, JOHN F. O'CONNOR, a citizen of the United States, residing at Chicago, in the county of Cook and State of Illinois, have invented a certain new and useful Improvement in Brake Mechanism, of which the following is a full, clear, concise, and exact description, reference being had to the accompanying drawings, forming a part of this specification.

My invention relates to improvements in brake mechanism.

In the particular embodiment of my invention shown in the drawings, the same is designed for use upon a railroad car.

One of the objects of my invention is to provide an efficient simple hand brake. Another object is to provide a brake in which springs shall be eliminated. Further objects will appear from a description of the invention hereinafter following.

In the drawings forming a part of this specification, Figure 1 is a side elevation of the end of a railroad car—as, for instance, a flat car, showing my improved brake mounted thereon. Fig. 2 is an enlarged vertical section on line 2—2 of Fig. 1, showing the upper portion of said brake in elevation. Fig. 3 is a horizontal section on line 3—3 of Fig. 1. And Fig. 4 is a horizontal section on line 4—4 of Fig. 1.

Referring to the drawings, the numeral 10 indicates the side sill of a railroad car near its end, 11 the end sill secured thereto, 12 a step and 13—13 grab irons, all of the same being usual parts of a car. The brake staff 14 is mounted upon the end of the car and is supported at the bottom by means of the bracket 15. Near the upper end of the staff a bracket 16 is secured to the car, the said bracket having at its upper portion a circular member 17, closed at the bottom with the preferably integral plate 18 suitably perforated, as at 19, for the passage of the brake staff. Within the said member 17 and mounted upon the upper portion of the staff, which is squared thereabove, as indicated by the numeral 20 in Fig. 1 is the holding ratchet 22 adapted to be engaged by the holding pawl 23, hereinafter more particularly described.

The wall of the bracket member 17 is provided with a slot 24 through which the arm 25 of the holding pawl 23 passes. Within the bracket member 17 a lug 26 inclined from the vertical is provided, shown in the dotted lines in Fig. 2 of the drawings. Upon this lug the pawl is pivoted, as indicated at 27 in Fig. 4. The inner end of the holding pawl is angularly disposed in reference to the portion 25 thereof, and at its inner end is provided with the tooth 28 adapted to engage with the teeth 29 of the holding ratchet 22. By reason of the position and the mounting of the holding pawl 23, the same, through gravity, remains in engagement with the holding ratchet 22, except when, at the will of the operator, the pawl is withdrawn from engagement by means of its handle 25 and the brake released.

The holding ratchet 22 has an upwardly extended hub or sleeve 30, indicated by the dotted lines in Fig. 2 of the drawings. The upper portion of this hub or sleeve extends within a circular opening 31 provided in the lower plate 32 of the casing or sleeve 33, which is mounted about the brake staff 14 above the bracket member 17. Above the casing is mounted the cap—hereinafter sometimes called the operating ratchet—34 provided with a central vertical perforation 35 for the passage of the upper end of the squared portion of the brake staff, and above this a washer 36 is mounted upon the staff, all being held in position by suitable means—as, for instance, the nut 37 threaded upon the end of the staff. The cap or operating ratchet 35 is provided on its lower face with the ratchet teeth 38, most clearly shown in dotted lines in Fig. 2 of the drawings. It will be noted that the cap 34 is fixed upon the brake staff and that the same must turn therewith. The casing or sleeve 33 is adapted to turn in reference to the staff and in reference both to the portion 17 of the bracket member 16 and the cap or operating ratchet 34.

The side wall of the casing 33 is provided with an inclined slot 39, through which the operating lever 40 passes. At its outer end, the operating lever 40 is provided with the extended handle 41 and at its inner end with the curved member 42, perforated at its end, as at 43, for the passage of a pivot pin 44 inclined from the vertical and which, by means of the lug 45 rigidly secured to the inner portion of the casing 33 opposite the slot 39 thereof, pivots the said handle to the casing at a point substantially opposite the shaft from the inclined slot 39. The operating lever 40 is provided with a tooth 46 which may be, as shown in Fig. 2, the angular edge of the said operating handle. It will also be noted that the pivot pin 44 is arranged substantially at right angles to the slot 39, as indicated by the dotted lines in Fig. 2 of the drawings.

In the particular embodiment of my invention shown in the drawings, the operating ratchet or cap 34 moves in contraclockwise direction on winding of the brake. To effect such movement, the operator grips the handle 41, pulls it toward him and the same, from its position of disengagement, as shown in Fig. 2 of the drawings, automatically slides in the inclined slot 39 upwardly until the tooth 46 thereof engages with the teeth 38 of the operating ratchet, and thereupon the operating ratchet and the casing 33 all move with the handle, the operating ratchet turning the brake staff to wind up a brake chain, which, it is understood, is adapted to be secured to the lower end of said staff. During this operation, the holding pawl will automatically disengage from the holding ratchet 22 and ride from tooth to tooth thereon until at the end of the winding movement, or a slight release by the operator, gravity will bring the holding pawl 23 into its locking or holding engagement with the ratchet 22, preventing unwinding of the brake staff, until the operator, if he so desires, manually releases the same. On winding the staff by means of the handle 41 a suitable amount, the operator can return the handle for further winding by pushing the same in a clockwise direction, and, during this operation, or upon release of the handle, gravity will bring the same out of its engagement with the operating ratchet 34, and the said handle, together with the casing 33, in which it is mounted, will turn with the handle in disengaged position to such point as the operator desires, when, upon further pull in contraclockwise direction, the operating handle will again engage the operating ratchet 34, as hereinbefore described.

The casing 33 is provided, as indicated by the dotted lines in Fig. 2 of the drawings, with a stop member 47 which depends below the lower edge of the casing 33 and is adapted to engage the holding pawl 25 on one side or the other, depending upon the direction of the revolution of the casing 33, to limit the turning of said casing and thus limit the turning of the operating lever 40 to prevent its accidental projection from the car and the dangers attendant thereon. The said brake, it will be observed, is simple in its construction and operation, is positive in action and uses no springs or other elements likely to dangerously wear or lose their efficiency, has a long operating handle, may be safely used, and the operating parts are protected against the weather or other destroying elements. Its vertical dimensions are small and thus it is especially adapted for flat cars, timber, ore or other similar cars in connection with which shovels or other mechanical means for discharging cargo are employed.

I claim:

1. In a brake, in combination, a brake staff, a ratchet rigidly secured thereto, a revoluble casing associated with said ratchet and an operating handle for the ratchet, the casing being provided with an opening inclined relatively to the axis of the staff for the passage of the handle, the said handle being pivoted in the casing opposite said opening and having a movement lengthwise of the staff within said slot.

2. In a brake, the combination with a staff, of a ratchet rigidly mounted thereon, a revoluble sleeve upon said staff and an operating handle, the ratchet being provided with teeth entering said sleeve, the handle having means for engaging said teeth, the sleeve being provided with an angular slot for the passage of the handle and the said handle being pivoted to the sleeve opposite said slot.

3. In a brake, in combination, a staff, a revolving casing thereon, a ratchet rigidly secured to said staff, and an operating handle, the ratchet being provided with teeth entering said casing, the handle having means for engaging said teeth, the casing being provided with a slot inclined relatively to the axis of the staff, the handle being pivoted to said casing and having a sliding movement in said slot.

4. In a brake, in combination, a vertical brake staff, a ratchet rigidly secured thereto, a bracket member surrounding said staff, a revolving sleeve mounted above said bracket and an operating handle, the ratchet having teeth extended into said sleeve, the sleeve being provided with a slot inclined relatively to the axis of the staff for the passage of said handle, the said handle being pivoted to the sleeve opposite said slot.

5. In a brake, in combination, a staff, a ratchet rigidly secured thereto, an operating handle adapted to engage said ratchet, a revolving member associated with said ratchet, the said member having an angular slot for the passage of the handle, the said handle being connected with said member through pivotal means.

6. In a brake, in combination, a brake staff, a bracket associated therewith, a revolving sleeve mounted upon said bracket, a ratchet wheel rigidly secured to the staff above said sleeve and an operating handle, the ratchet wheel having teeth extending into said sleeve, the sleeve having a slot inclined relatively to the axis of the staff to receive said handle, the said handle being pivoted to the sleeve opposite said slot, the handle being provided with means to engage the ratchet teeth through sliding movement of the handle in said slot.

7. In a brake, in combination, a brake staff, a bracket associated therewith, a revolving sleeve upon said staff, a ratchet rigidly secured thereto and an operating handle for said ratchet, the bracket being provided with a hub engaging said sleeve, the ratchet being provided with teeth entering said sleeve, the handle being pivoted to said sleeve, the sleeve having a slot inclined relatively to the axis of the staff, the handle having a sliding movement in said slot.

8. In a brake, in combination, a brake staff, a bracket associated therewith, a revolving sleeve mounted upon said bracket, a ratchet rigidly secured to the staff and an operating handle for said ratchet, the sleeve being provided with a slot inclined relatively to the axis of the staff, the handle passing through said slot and being pivotally connected to the sleeve, the said handle engaging the ratchet at the upper end of the slot and being disengaged therefrom at the lower end of the slot.

9. In a brake, in combination, a brake staff, a ratchet wheel rigidly secured thereto, a revolving sleeve associated with said ratchet, an operating handle pivoted to said sleeve and a diagonal slot in said sleeve, the handle being guided in said slot into engagement with said ratchet and sliding by gravity therein in disengaging from said ratchet.

10. In a brake, in combination, a brake staff, a ratchet rigidly secured thereto, a revolving sleeve associated therewith, and an operating handle to engage said ratchet, the said handle being pivoted to said sleeve about an axis extending at an angle relatively to the axis of the staff.

11. In a brake, in combination, a brake staff, a ratchet rigidly secured thereto, a revolving sleeve associated therewith, and an operating handle to engage said ratchet, the said handle being pivoted to said sleeve about an axis extending at an angle relatively to the axis of the staff, whereby the handle on initial movement swings into engagement with the ratchet and through gravity is released therefrom.

12. In a brake, in combination, a brake staff, a ratchet rigidly secured thereto, a revolving sleeve associated with said ratchet, and an operating handle pivoted to said sleeve about an axis extending at an angle relatively to the axis of the staff, the said handle being provided with means to engage the ratchet in one position and swinging by gravity to a disengaged position.

13. In a brake, in combination, a brake staff, a ratchet rigidly mounted thereon, a revolving sleeve associated with said ratchet, and an operating handle pivoted to said sleeve about an axis extending at an angle relatively to the axis of the staff, the said operating handle having a curved portion passing about the staff, the sleeve having a slot inclined relatively to the axis of the staff for the sliding movement of the handle therein.

14. In a brake, in combination, a brake staff, a ratchet rigidly mounted thereon, a revolving sleeve associated with said ratchet, and an operating handle pivoted to said sleeve about an axis extending at an angle relatively to the axis of the staff, the said operating handle having a curved portion passing about the staff, the sleeve having a slot inclined relatively to the axis of the staff for the sliding movement of the handle therein, said slot being opposite the handle.

15. In a brake, in combination, a staff, a ratchet wheel mounted thereon, and a pivoted handle associated with said staff, the said handle having a diagonal movement to engage the same with, and disengage it from, said ratchet.

16. In a brake, in combination, a brake staff, a holding ratchet thereon, a pawl for said holding ratchet, a bracket to support said pawl, a revolving sleeve upon said staff, an operating ratchet fixed to said staff, and an operating handle for the ratchet, said handle being pivoted to the sleeve, the said sleeve being provided with a stop member, said stop member being adapted to engage the holding pawl to limit the rotation of the sleeve.

17. In a brake, the combination with a rotatable element adapted to effect tightening of a brake chain; of a ratchet wheel rotatable in unison with said element; a member adjacent said ratchet wheel and rotatable relatively to said element; an operating handle pivotally attached to said member and having a pawl adapted to coöperate with said ratchet wheel, said member being provided with means for positively guiding said pawl partly lengthwise of said element into coöperative relation with said ratchet wheel when said handle is pulled in a general winding direction relative to said element, said handle, when released, falling under the influence of gravity to a position where said pawl is disengaged from the ratchet wheel; and means for holding said element against accidental rotation in an unwinding direction.

In witness that I claim the foregoing I have hereunto subscribed my name this 6th day of June, 1919.

JOHN F. O'CONNOR.